United States Patent [19]

Masuda et al.

[11] Patent Number: 4,782,207
[45] Date of Patent: Nov. 1, 1988

[54] ELECTRODE ROLL

[75] Inventors: Shunsuke Masuda, Kamakura; Masatoshi Yamamoto, Sagamihara; Katsuyoshi Shudo, Sagamihara; Hiroyuki Kato, Sagamihara; Yasushi Kawai, Sagamihara, all of Japan

[73] Assignee: Daiwa Can Company, Limited, Tokyo, Japan

[21] Appl. No.: 898,064

[22] Filed: Aug. 19, 1986

[30] Foreign Application Priority Data

Aug. 21, 1985 [JP] Japan .................... 60-183749

[51] Int. Cl.$^4$ .................... B23K 11/06; B23K 35/00
[52] U.S. Cl. .................... 219/84; 219/81
[58] Field of Search .................... 219/84, 81, 82, 83, 219/119

[56] References Cited

U.S. PATENT DOCUMENTS

| 3,501,611 | 3/1970 | Opprecht | 219/84 |
| 4,188,523 | 2/1980 | Kawai et al. | 219/83 |
| 4,433,229 | 2/1984 | Morikawa et al. | 219/84 |
| 4,642,437 | 2/1987 | Yamamoto et al. | 219/84 |

FOREIGN PATENT DOCUMENTS

| 2351534 | 3/1975 | Fed. Rep. of Germany | 219/84 |
| 2805345 | 8/1979 | Fed. Rep. of Germany | 219/84 |
| 56-62680 | 5/1981 | Japan . | |
| 56-77076 | 6/1981 | Japan . | |

Primary Examiner—E. A. Goldberg
Assistant Examiner—C. M. Sigda
Attorney, Agent, or Firm—Flynn, Thiel, Boutell & Tanis

[57] ABSTRACT

An electrode roll for an electric resistance seam welding machine comprises a stator substantially made of copper or a copper alloy, a rotor mounted on the periphery of the stator, and substantially or in part made of copper or a copper alloy and rotatably a gap portion formed by the stator and the rotor. A conductive liquid metal, which is a fusible alloy composed mainly of gallium, is inserted in the gap portion through a filling hole and is sealed in the gap portion. At least the portion of the filling hole that may come in contact with the conductive liquid metal is fabricated of a metal or metal alloy which is hard to be corroded by the fusible alloy. The remaining surfaces of both rotor and stator facing the gap portion are covered with a layer or layers of a metal or metal alloy that is hard to be corroded by the fusible alloy. In at least one embodiment, such layer or layers are further covered with another thin layer of metal which has an excellent wettability by the fusible alloy.

12 Claims, 4 Drawing Sheets

ELECTRODE ROLL

BACKGROUND OF THE INVENTION

1. Field of Invention

This invention relates to an electrode roll for a welding machine in which a side seam of overlapped metal sheet of a can body is formed by electric resistance seam welding. More specifically, the invention concerns an electrode roll in which a fusible and conductive liquid alloy composed mainly of gallium is sealed in a gap formed between a stator and a rotor.

2. Description of the Prior Art

Up to date, a side seam of overlapped portions of a can body, i.e., a blank of such metal sheet as tin- or nickel-plated steel sheet set in a cylindrical form, is formed by an electric resistance seam welding process. In this process, the overlapped portions of the can body are squeezed via a copper wire electrode between electrode rolls on their inner and outer sides while current is passing through them.

The electrode roll used in an electric resistance seam welding process as shown in FIG. 1, has a rotor 102 rotatably mounted on the periphery of stator 100 via an insulated bearing 101.

A disk-like portion 100a is formed in axial center position of the stator 100. There is a small gap between the outer periphery of the disk-like portion 100a and inner surface of rotor 102.

The gap formed between outer periphery of the disk-like portion 100a and inner surface of rotor 102 is filled with conductive liquid metal 103.

In order to let welding current flow between stator 100 and rotor 102 via the conductive liquid metal 103, the conductive metal stator and rotor have copper or copper alloy parts which face the gap.

The conductive liquid metal 103 filling the gap of the electrode roll is described here.

Usually, mercury is widely used as the conductive liquid metal of the electrode roll. The reason is that the mercury has a very low melting point of $-39°$ C., and it maintains the liquid phase not only at normal temperature but also at a considerably lower temperature.

However, mercury has considerably strong toxicity, and therefore, a substituted material is desired.

As a result of extensive studies by the inventors, it has been found that a four-element alloy composed of 67 wt % of gallium, 20 wt % of indium, 10 wt % of tin and 3 wt % of zinc has a solidifying point of $6.5°$ C. and a melting point of $8.5°$ C. as well as having a resistivity of 22 $\mu\Omega.cm$, i.e., more than four times the conductivity of mercury whose resistivity is 95.8 $\mu\Omega.cm$.

Other fusible alloys composed mainly of gallium and used as conductive liquid metal for electrode roll are, for example, the six-element fusible alloys (Ga, In, Sn, Zn, Ag, Al) and the binary alloy (Ga, In) proposed (Japanese Patent Publication No. 40355/1980, No. 40359/1980 and Japanese Patent laid-open Publication No. 62680/1981, No. 77076/1981), are partly used.

However, in case the fusible liquid alloy composed mainly of gallium is used as the conductive liquid metal in the electrode roll, its melting point tends to rise and to make itself become easier to solidify because gallium strongly attacks copper and copper alloy and corrodes copper and copper alloy forming a rotor and a stator so that such copper and copper alloy are dissolved into the liquid metal when the electrode is in use. The resultant problem is that life of the electrode roll will he shortened very badly.

In order to solve the problem the applicants have proposed before (Patent Application No. 278822/1984) to plate the rotor and stator surfaces facing the gap with a tungsten-cobalt alloy which is harder to be corroded by the fusible alloy.

A filling hole is provided in the rotor for filling conductive liquid metal into the electrode roll. The inner surface of the filling hole is harder to be covered with a complete protective film of metal or metal alloy provided by means of electroplating etc., as compared with the rotor inner face other than this portion. Therefore, if there is any portion in the inner surface of the filling hole, which is not adequately covered with such protective film, corrosion attacks will concentrate in such portion.

When concentrated corrosion happens, copper in the rotor melts and is introduced into the fusible liquid alloy, causing the melting temperature of the fusible alloy to rise and the fusible alloy to solidify easier. As a result, the life of the electrode roll is shortened.

The rate of such concentrated corrosion relates to the location of the filling hole and a tendency is such that the corrosion develops more badly when the filling hole is provided at such a location as shown in FIG. 1, where welding current is larger than the hole is provided in a portion where welding current is small.

SUMMARY OF THE INVENTION

The first object of the invention is to extend the life of the said electrode roll, which uses a fusible alloy mainly composed of gallium as conductive liquid metal, by protecting the stator and rotor surfaces facing the electrode's gap and also by protecting the inner surface of the filling hole provided in the said rotor for filling fusible alloy.

The second object of the invention is to further extend the life of the said electrode roll, which uses a fusible alloy mainly composed of gallium as conductive liquid metal, by protecting the stator and rotor surfaces facing the electrode roll's gap and also by protecting the said inner surface of the filling hole provided in the said rotor for filling fusible alloy and further by increasing the electric conductivity and reducing heat generation of the said electrode roll through reduction of electric resistance of contact between the stator and the fusible alloy and the rotor and the fusible alloy.

DESCRIPTION OF THE PREFERRED EMBODIMENT

Examples of the Invention will be given below in detail based on drawings.

Figure 1:
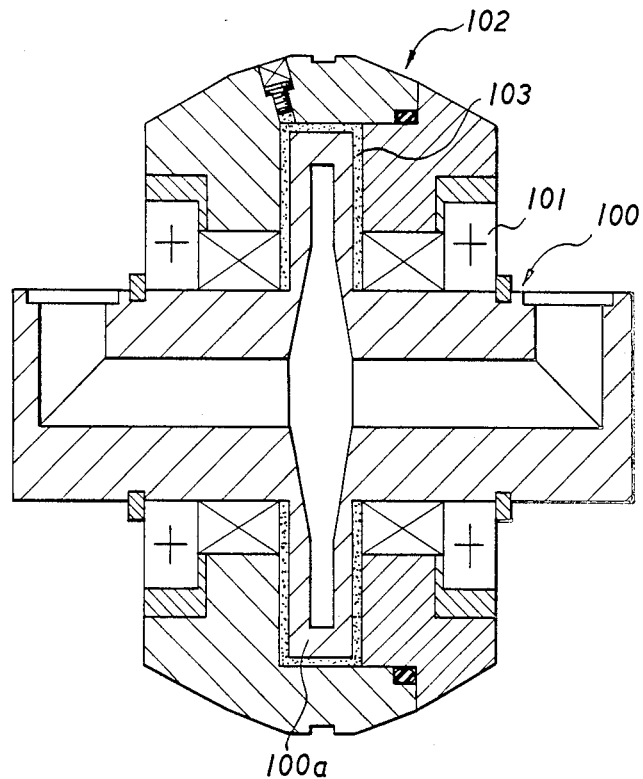
FIG. 1 is an axial sectional view showing an embodiment of a Prior Art electrode roll.
Figure 2:
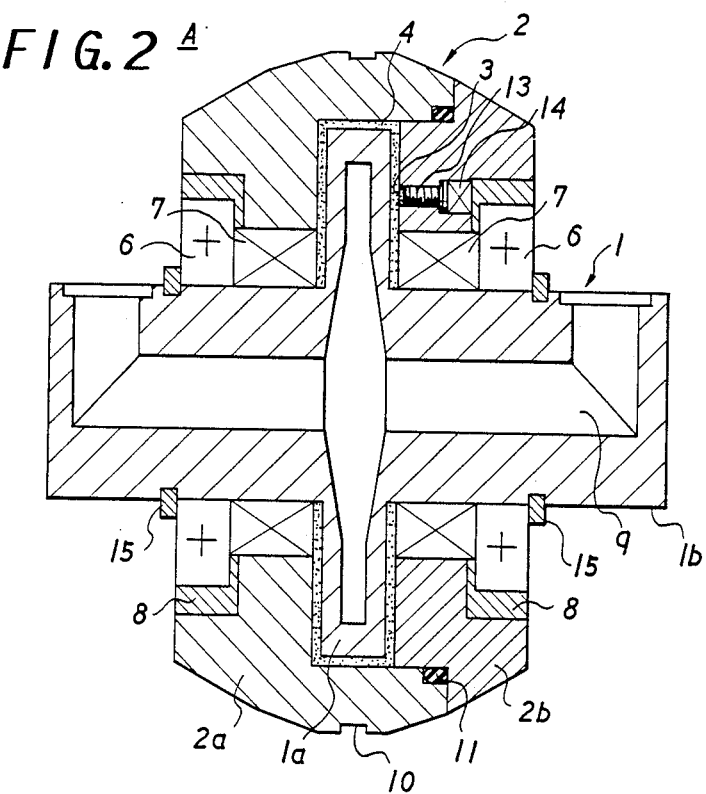
FIG. 2 is an axial sectional view showing an example of the electrode roll embodying the present invention (Example 1).
Figure 3:
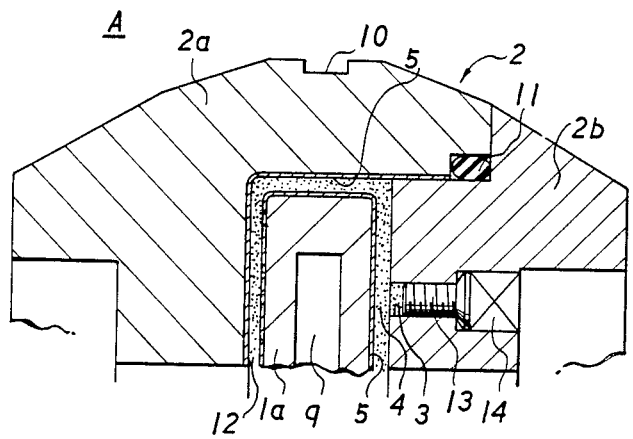
FIG. 3 is an axial sectional view showing the main part of the electrode roll in Example 1.

At first, structure of the electrode roll of Example 1 indicated in FIG. 2 and FIG. 3 is described.

Referring to electrode roll A of Example 1, there are stator 1, rotor 2, filling hole 3, conductive liquid metal 4, electroplating layer (covering metal) 5, two bearings 6, two seal rings 7, and two insulation rings 8.

The whole body or a major portion of stator 1 is made of copper or copper alloy, a disk-like portion is formed in its axial center, and a cooling water passage 9 to prevent overheating is provided inside the axis portion 1b and disk-like portion 1a.

A major portion of rotor 2 is made of copper or copper alloy. It is rotatably mounted on stator 1 via a pair of bearings 6. It consists of a conductive rotor 2a made of highly conductive copper or copper alloy, and a corrosion protective rotor 2b made of metal hard to be attacked by (resistant to corrosion by) fusible alloys composed mainly of gallium.

Conductive rotor 2a is formed with a groove 10 which accommodates a wire electrode, in the contact part of the conductive rotor 2a and corrosion protective rotor 2b, an O ring 11 is provided to prevent leakage of conductive liquid metal 4.

Filling hole 3 is provided for filling conductive liquid metal 4 into a gap 12 formed in between the stator 1 and rotor 2 using a liquid filler, and is drilled in the side portion of corrosion protective rotor 2b of rotor 2 where the welding current is low.

After conductive liquid metal 4 is filled through the filling hole 3, a plug 13 and packing 14 are provided for sealing. Packing 14 is made for example with synthetic resin or rubber.

Conductive liquid metal 4 is a fusible alloy composed mainly of gallium. It is sealed into the gap 12 between stator 1 and rotor 2 so that the welding current can flow between stator 1 and rotor 2. Six-element fusible alloy (Ga, In, Sn, Zn, Ag, Al), five-element fusible alloy (Ga, In, Sn, Zn, Ag), four-element fusible alloys (Ga, In Sn, Zn, and Ga, In, Sn, Ag), three-element fusible alloy (Ga, In, Ag), and two-element fusible alloys (Ga, In and Ga, Ag) etc., are used as the fusible alloys.

Electroplated layer 5 includes the surface of stator 1 facing gap 12, the outer periphery of the disk-like portion 1a and the inner surface of conductive rotor 2a included in stator 2 that faces gap 12. This covering layer of metal or metal alloy, which is hard to corrode by a fusible alloy composed mainly of gallium, can be a single layer or multiple layers.

Bearings 6 are used for supporting the rotor 2 so that it is rotatable against the stator 1. Each of the insulation rings 8 made of insulation material is installed in between the bearing and rotor 2. Similarly, each of the seal rings 7 is placed in between each bearing and the gap 12 to prevent leakage of conductive liquid metal. These seal rings are, for example, made of rubber or resin like tetrafluoroethylene.

In the stator 1, two snap rings 15 are installed to hold the bearings.

Materials used in each component of electrode roll A of Example 1 are described below.

A high conductivity copper-chromium alloy is used for stator 1.

A high conductivity copper-beryllium alloy is used for conductive rotor 2a, and a steel alloy adding under 0.08% of carbon, 1.0% of silicon, under 2% of manganese, under 0.045% of phosphorus, under 0.03% of sulfur, 8.00–10.50% of nickel, 18.00–20.00% of chromium is used for corrosion protective rotor 2b.

The electroplating layer 5 containing cobalt and tungsten in weight ratio of 40:60 has an electroplating thickness of 5–10 μm.

A fusible four-element alloy composed mainly of gallium 65.5 wt %, indium 21.3 wt %, tin 9.6 wt % and zinc 3.6 wt % is used as the conductive liquid metal 4.

Next, experiment using electrode roll of Example 1 to make can body is described below.

(Experimental Materials)

Prepare a sufficient amount of tin platings of 0.22 mm thickness with tinplatings on both sides being 2.8 g/m$^2$ for fabricating 2 million cans and also prepare a sufficient amount of the same material with extremely thin tin platings (River-weld material produced by Kawasaki Steel Manufacturing Co., Ltd.) for fabricating nine hundred thousand cans.

(Can Fabricating Speed) 500 cans/min (Welding Current and Electrode Roll Pressure) For 0.22 mm tin platings The secondary currents of welding machine is 4200A
For 0.22 mm tin platings with extremely thin tin plating
The secondary current of welding machine is 4000A
The electrode roll pressure is 40 kg.f (Experimental Results)

The can body welding condition is the same as the case of former electrode roll using mercury as conductive liquid metal.

Temperature of the electrode roll in use is not higher than that of the former electrode roll whose rotor was made only with copper or copper alloy.

After welding 2.9 million cans, the electrode roll was disassembled, and its gap portion was inspected, the steel alloy including filling hole of the corrosion protective rotor 2b was not corroded at all, and it could be used to make cans again.

It is clear from the foregoing experiment that in the electrode roll A of Example 1 of this Invention, leakage of conductive liquid metal 4 from filling hole 3 disappears because corrosion disappears there; also, no copper or copper alloy was dissolved due to conductive liquid metal 4, and therefore, life of electrode roll A becomes considerably longer.

In addition, because no electroplating is required for corrosion protection of rotor 2b, fabrication of the electrode is simplified.

Figure 4:
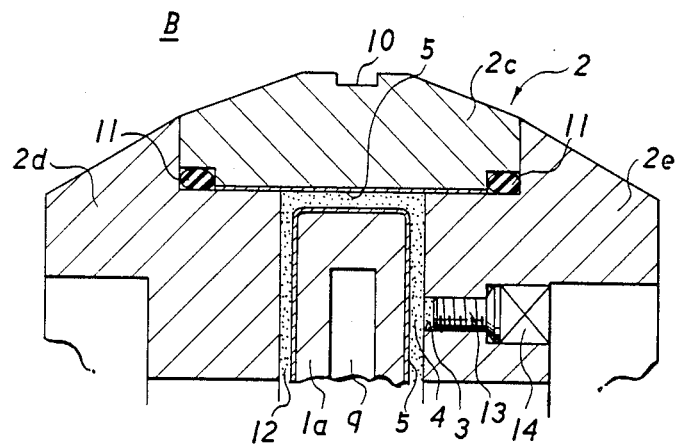
FIG. 4 is an axial sectional view showing the main part of the second example of the electrode roll embodying the present invention (Example 2).

Electrode roll B of Example 2 shown in FIG. 4 is described below.

In Example 2, rotor 2 includes the conductive rotor 2c in outer periphery as well as the first corrosion protective rotor 2d and the second corrosion protective rotor 2e in both sides. The inner surface of electrode rotor 2c is applied by electro-plated layer 5.

Similarly, because other structures and materials are the same as described in Example 1, therefore, description is omitted by using the same notations in drawings.

The electrode roll B of Example 2 was used to make 3 million cans of the River-weld material using 4000A of welding current. The same experimental results were obtained as in Example 1.

In Example 2, the portion to be electroplated was not only narrower than in Example 1, but also there was no corner in inner surface of electroplating layer 5, thus covering using electroplating method etc., became easier, and therefore, not only management became easier, but also corrosion could be prevented more effectively.

Figure 5:
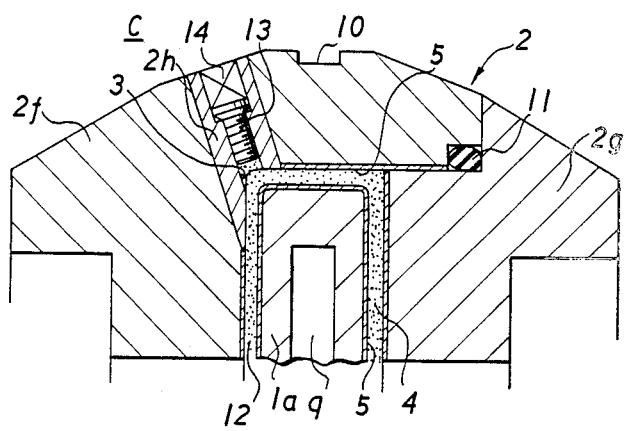
FIG. 5 is an axial sectional view showing the main part of another example of the electrode roll embodying the present invention (Example 3).

Electrode roll C of Example 3 shown in FIG. 5 is described below.

In Example 3, rotor 2 is formed by rotors 2f and 2g made of copper or copper alloy. Inner surfaces facing gap 12 were covered with electroplating layer 5. The filling hole 3 is defined by a filling hole component 2h made of metal which is hard to corrode by fusible alloy composed mainly of gallium and attached to the rotor 2f. Component 2h is, for example, made of steel alloy adding under 0.08% of cobalt, under 1.0% of silicon, under 2.00% of manganese, under 0.045% of phosphorus, under 0.03% of sulfur, 8.00–10.50% of nickel, 18.00–20.00% chromium.

Similarly, because other structures are the same as described in Example 1, therefore description is omitted by using the same notations in drawings. As for the effectiveness, though there are many portions to be electroplated, it obtains nearly the same effectiveness as in Example 1 and Example 2.

Hence at least such portion of the inner wall of the filling hole that may come in contact with the said conductive liquid metal sealed in the gap portion is made of such metal or metal alloy which is hard to be corroded by the said fusible alloy composed mainly of gallium. Also, the portion of the rotor surface facing the gap, other than such metal or metal alloy that is hard to be corroded by above-mentioned fusible alloy composed mainly of gallium, as well as the portion of the stator surface facing the gap, is fabricated with conductive components covered by a layer or layers of metal or metal alloy that is hard to be corroded by the fusible alloys.

Clearly, the electrode roll that has a structure to fill and seal with a fusible alloy composed mainly of gallium as the conductive liquid metal in a gap between its stator and rotor; after it even undergoes a long welding operation, all its portions including the filling hole in the rotor, which are in contact with conductive liquid metal, are protected by metal which is hard to corrode by a fusible alloy composed mainly of gallium, or by metal alloy covering (a layer or more). Therefore, the electrode roll will prevent leakage of the fusible alloy from the filling hole due to corrosion caused by the fusible alloy composed mainly of gallium, and prevent copper or copper alloy from dissolving into the fusible alloy. Such roll also possesses a superior electric conductivity to the former electrode roll which has for a long time used mercury as its conductive liquid metal.

Figure 6:
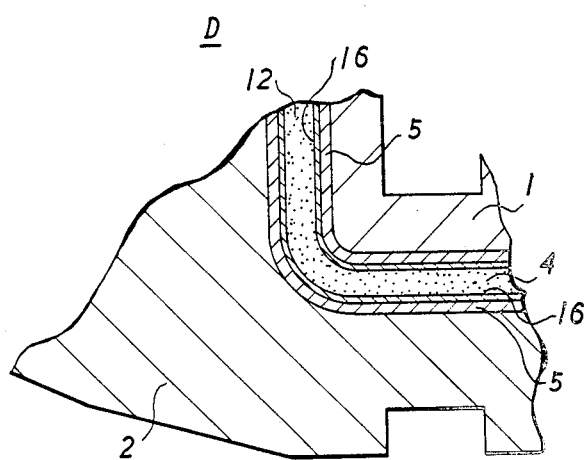
FIG. 6 is an axial sectional view showing the main part of another example of the electrode roll embodying the present invention (Example 4).

Next, electrode roll D of Example 4 shown in FIG. 6 is described below.

Example 4 is completely the same as Example 1. The only difference is that an electroplating layer 16 of tin or zinc, which possesses an excellent wetting property with the fusible alloy composed mainly of gallium, is plated on top of the electroplating layer 5 of metal that is hard to corrode by the fusible alloy composed mainly of gallium and coated on top of stator 1 and rotor 2.

The newly added electroplating layer 16 may be thin, e.g. 0.1–1.5μm, though not limited thereto, and has for example a thickness of 0.1–1.5μm, and the thiner it is the better.

The upper limit of thickness of the electroplating layer 16 is better kept in such a way that even the metal of the said layer 16 is completely melted into the fusible alloy composed mainly of gallium which is used as the conductive liquid metal 4, the melting temperature of the fusible alloy will not become higher than that of gallium (29.8° C.).

In this way, as the working temperature of the electrode roll D is made sufficiently higher than that of gallium, the said fusible alloy will remain in liquid state and continue to play its excellent characteristics as a conductive liquid metal 4.

In this Example, apart from 0.5 μm of electroplating layer 16, completely the same electrode roll and the same condition were used to weld a can body made of 0.22 mm tin platings as what has been used in Example 1.

The electrode roll had no abnormality in rotation torque of rotor even after 250 hours of welding operation by the electrode roll D. It was disassembled and its inside inspected; the whole tin plated layer was adhered by the fusible alloy composed mainly of gallium.

Electrode roll D in this Example indicated that the fusible alloy composed mainly of gallium would wet the tin layer to corrode it, and at the same time adhere to the corroded portion. Therefore, electric resistance among the said fusible alloy and stator and rotor became smaller. This in turn would suppress heat generation in the contact surfaces during welding operation, thus corrosion by the fusible alloy to the electroplating layer of cobalt-tungsten alloy under the tin layer was suppressed, and deterioration of seal ring 7 was suppressed too.

Apart from tin, metals used for electroplating layer 16 are zin, silver, gallium, indium, aluminium, etc. Either a monometallic layer in a or alloy plated layer, single layer or multiple layers, can be used.

As for metal covering methods, apart from the electroplating method, well known methods such as vacuum evaporation method for melting metal spray method etc., can be used.

Concerning the metals, which are hard to corrode by the said fusible alloy composed mainly of gallium used in the same Examples, apart from steel alloys, choice can be made from monometals or alloys such as steel alloys that contain impurities of 0.95–1.20% of carbon, under 1.00% of silicon, under 1.00% of manganese, under 0.040% of phosphorus under 0.03% of sulfur, and 16.00–18.00 % of chromium; or impurities of 0.95–1.10% of carbon, 0.15–0.35% of silicon, under 0.50% of manganese, under 0.025% of phosphorus, under 0.025% of sulfur, and 1.30–1.60% of cromium; or pure iron, coblat, cobalt-tungsten alloy, chromium-steel alloy, chromium-nickel-steel alloy, etc.

Concerning the covering metal, a part from the cobalt-tungsten alloy used in the said examples, there are cobalt, pure iron, steel alloys, etc.

As for the metal coating, apart from the electroplating shown in the Examples, melting metal spray coating and other methods are used.

Hence at least such portion of the inner wall of the filling hole that may come in contact with the said conductive liquid metal sealed in the gap portion is made of such metal or metal alloy which is hard to be corroded by the said fusible alloy composed mainly of gallium, and the portion of the rotor surface facing the gap other than such metal or metal alloy that is hard to be corroded by the above-mentioned fusible alloy composed mainly of gallium and as the portion of the stator surface facing the gap fabricated with conductive components is covered by a layer or layers of metal or metal alloy that is hard to be corroded by the fusible alloys. Furthermore, on top of the metal coating, coating of the said metal, which has an excellent wet property to the fusible alloy, maybe added.

Moreover, the single layer or multiple layers of metal can be covered with a thin layer of a single metal or layer of alloy made of more than two metals, which can be selected at least from a goup formed by tin, zinc, silver, gallium, indium, aluminium. Therefore, if the electrode roll that has a structure to fill and seal with a fusible alloy composed mainly of gallium as the conductive liquid metal in a gap between its stator and rotor undergoes even a long welding operation, its heat generation due to electric resistance of the contact surfaces is described, because most of the portion in contact with the fusible alloy, can be coated with thin layer of metals (each metal has an exellent wet property with the fusible alloy) or thin layers of alloys made of more than two metals which can be selected from a group formed by tin, zinc, silver, gallium, indium, aluminum, so that the contact surfaces of the fusible alloy with the stator and rotor have an excellent wet property. For this reason, electric conductivity of the electrode roll is enhanced. Meanwhile, as the metal layer or layers, alloy sublayer or sublayers are hard to corrode by the fusible alloy, therefore the corrosion rate due to the fusible alloy decreased considerably. As a result, conductivity is excellent so that the electrode roll can be used longer.

As aforementioned, the structure of this invention is not limited to the Examples, and design alternations that do not exceed the essential points of the invention are included in this invention.

What is claimed is:

1. An electrode roll of an electric resistance seam welding machine, comprising:
   a stator fabricated substantially with copper or copper alloy components;
   a rotor fabricated substantially or in part with copper or copper alloy components and rotatably mounted around said stator;
   a gap portion formed by said stator and said rotor;
   a filling hole provided in said rotor and extending into said gap portion;
   a conductive liquid metal filled through said filling hole and sealed in said rotor in said gap portion, said conductive liquid metal being made of a fusible alloy composed mainly of gallium, said filling hole having an inner wall, at least that portion of said filling hole inner wall as may contact said conductive liquid metal being made of a metal or metal alloy that is hard to be corroded by said fusible alloy, said rotor comprising (1) a copper or copper alloy rotor member fabricated with copper or copper alloy components and (2) a corrosion resistant rotor member which is itself made of a metal or metal alloy that is hard to be corroded by said fusible alloy;
   at least one layer of one or more metals or metal alloys that are hard to be corroded by said fusible alloy, the surface of said copper or copper alloy rotor member facing said gap portion being covered with said at least one layer, said at least one layer also covering the surface of said stator facing said gap portion, said filling hole being provided in said corrosion resistant rotor member such that the surface of said filling hole is thereby resistant to corrosion by said fusible alloy.

2. An electrode roll as defined in claim 1, wherein said fusible alloy composed mainly of gallium is one of the following alloys: a six-element fusible alloy composed of Ga, In, Sn, Zn, Ag, and Al, a five-element fusible alloy composed of Ga, In, Sn, Zn and Ag, a four-element fusible alloy composed of Ga, In, Sn and Zn, another four-element fusible alloy composed of Ga, In, Sn and Ag, a three-element fusible alloy composed of Ga, In and Ag, a two-element fusible alloy composed of Ga and In, and another two-element fusible alloy composed of Ga and Ag.

3. An electrode roll as defined in claim 1, wherein at least said portion of the inner wall of said filling hole is made of a metal or metal alloy that is selected from the group consisting of steel alloys, pure iron, cobalt, cobalt-tungsten alloys, chromium-steel alloys and chromium-nickel-steel alloys.

4. An electrode roll as defined in claim 1, wherein each of said at least one covering layer is formed by a metal or metal alloy selected from the group consisting of cobalt-tungsten alloys, cobalt, iron and steel alloys.

5. An electrode roll of an electric resistance seam welding machine, comprising:
   a stator fabricated substantially with copper or copper alloy components;
   a rotor fabricated substantially or in part with copper or copper alloy components and rotatably mounted around said stator;
   a gap portion formed by said stator and said rotor;
   a filling hole provided in said rotor and extending into said gap portion;
   a conductive liquid metal filled through said filling hole and sealed in said rotor in said gap portion, said conductive liquid metal being made of a fusible alloy composed mainly of gallium, said filling hole having an inner wall, at least that portion of said filling hole inner wall as may contact said conductive liquid metal being made of a metal or metal alloy that is hard to be corroded by said fusible alloy, said rotor comprising (1) a copper or copper alloy rotor member made of copper or copper alloy components and (2) a pair of corrosion resistant rotor members which are themselves made of a metal or metal alloy that is hard to be corroded by said fusible alloy, said pair of corrosion resistant rotor members being arranged on both sides of said copper or copper alloy rotor member; said filling hole being provided in at least one of said corrosion resistant rotor members such that the surface of said filling hole is thereby resistant to corrosion by said fusible alloy;
   at least one layer of one or more metals or metal alloys that are hard to be corroded by said fusible alloy, the surface of said copper or copper alloy rotor member facing said gap portion being covered with said at least one layer, said at least one layer also covering the surface of said stator facing said gap portion.

6. An electrode roll of an electric resistant seam welding machine, comprising:
   a stator fabricated substantially with copper or copper alloy components;
   a rotor fabricated substantially or in part with copper or copper alloy components and rotatably mounted around said stator;
   a gap portion formed by said stator and said rotor;

a filling hole provided in said rotor and extending into said gap portion;

a conductive liquid metal filled through said filling hole and sealed in said rotor in said gap portion, said conductive liquid metal being made of a fusible alloy composed mainly of gallium, said filling hole having an inner wall, at least that portion of said filling hole inner wall as may contact said conductive liquid metal being made of a metal or metal alloy that is hard to be corroded by said fusible alloy; and at least one layer of one or more metals or metal alloys that are hard to be corroded by said fusible alloy, said at least one layer covering (1) the surface of said rotor facing said gap portion, other than the part of said rotor surface defining said portion of said inner wall of said filling hole made of a metal or metal alloy hard to be corroded by said fusible alloy, and (2) the surface of said stator facing said gap portion, wherein said inner wall of said filling hole is a hollow tubular insert, said insert being made of a metal or metal alloy that is hard to be corroded by said fusible alloy, said insert being fitted into said rotor.

7. An electrode roll as defined in claim 5, wherein said fusible alloy composed mainly of gallium is one of the following alloys: a six-element fusible alloy composed of Ga, In, Sn, Zn, Ag, and Al, a five-element fusible alloy composed of Ga, In, Sn, Zn and Ag, a four-element fusible alloy composed of Ga, In, Sn and Zn, another four-element fusible alloy composed Ga, In, Sn and Ag, a three-element fusible alloy composed of Ga, In, and Ag, a two-element fusible alloy composed of Ga and In, and another two-element fusible alloy composed of Ga and Ag.

8. An electrode roll as defined in claim 5, wherein at least said portion of the inner wall of said filling hole is made of a metal or metal alloy that is selected from the group consisting of steel alloys, pure iron, cobalt, cobalt-tungsten alloys, chromium-steel alloys and chromium-nickel-steel alloys.

9. An electrode roll as defined in claim 5, wherein each of said at least one covering layer is formed by a metal or metal alloy selected from the group consisting of cobalt-tungsten alloys, cobalt, iron and steel alloys.

10. An electrode roll as defined in claim 6, wherein said fusible alloy composed mainly of gallium is one of the following alloys: a six-element fusible alloy composed of Ga, In, Sn, Zn, Ag, and Al, a five-element fusible alloy composed of Ga, In, Sn, Zn and Ag, a four-element fusible alloy composed of Ga, In, Sn and Zn, another four-element fusible alloy composed of Ga, In, Sn and Ag, a three-element fusible alloy composed of Ga, In and Ag, a two-element fusible alloy composed of Ga and In, and another two-element fusible alloy composed of Ga and Ag.

11. An electrode roll as defined in claim 6, wherein at least said portion of the inner wall of said filling hole is made of a metal or metal alloy that is selected from the group consisting of steel alloys, pure iron, cobalt, cobalt-tungsten alloys, chromium-steel alloys and chromium-nickel-steel alloys.

12. An electrode roll as defined in claim 6, wherein each of said at least one covering layer is formed by a metal or metal alloy selected from the group consisting of cobalt-tungsten alloys, cobalt, iron and steel alloys.

* * * * *